United States Patent [19]

Le Bayon et al.

[11] Patent Number: 4,482,617
[45] Date of Patent: Nov. 13, 1984

[54] BATTERY SEPARATORS

[75] Inventors: Rene Le Bayon, Baud; Roger Faucon, Auray; Jacqueline Legrix, Locmine, all of France

[73] Assignee: USM Corporation, Farmington, Conn.

[21] Appl. No.: 447,270

[22] Filed: Dec. 10, 1982

[51] Int. Cl.³ .................. H01M 2/16; H01M 2/18
[52] U.S. Cl. ............................ 429/143; 429/249
[58] Field of Search ............ 429/143, 146, 147, 247, 429/249

[56] References Cited

U.S. PATENT DOCUMENTS

| | | | |
|---|---|---|---|
| 1,218,967 | 3/1917 | Willard | 429/147 |
| 2,179,057 | 11/1939 | Schuetz | 154/45 |
| 2,465,493 | 3/1949 | Strickhouser et al. | 429/147 |
| 3,205,098 | 9/1965 | Hall et al. | 429/143 |
| 3,773,590 | 11/1973 | Morgan | 429/143 |
| 4,000,352 | 12/1976 | Hollenbeck et al. | 429/147 |
| 4,072,802 | 2/1978 | Murata et al. | 429/147 |

FOREIGN PATENT DOCUMENTS

| | | |
|---|---|---|
| 268406 | 2/1969 | Austria . |
| 518249 | 11/1955 | Canada . |
| 19520 | 11/1980 | European Pat. Off. . |
| 725763 | 5/1932 | France . |
| 783729 | 9/1957 | United Kingdom . |

Primary Examiner—Donald L. Walton
Assistant Examiner—Gerard P. Rooney, Jr.
Attorney, Agent, or Firm—John P. Morley

[57] ABSTRACT

A novel, improved battery separator and process for making the separator. Essentially, the separator carries a plurality of polymeric ribs bonded to at least one surface and the ribs have alternating elevated segments of uniform maxiumum heights and depressed segments along the length of the ribs.

6 Claims, 10 Drawing Figures

BATTERY SEPARATORS

BACKGROUND OF THE INVENTION

Part 1. The Field of the Invention

This invention relates to battery separators and particularly to battery separators carrying a plurality of polymeric ribs on at least one surface of the separator.

Part 2. Description of the Prior Art

Battery separators are known to the art and their desired combination of performance characteristics are well defined. Essentially, a separator must have low electrical resistance, must be wettable by, but resistant to, the electrolytic fluid and must provide sufficient porosity to permit effective passage of electrolyte through the separator when positioned between adjacent positive and negative plates of the battery. Ideally, battery separators should provide minimal thickness and weight per unit area but at the same time have sufficient mechanical strength and integrity to sustain the conditions involved in the production and handling of the separator as well as the conditions encountered in the assembly and operation of the battery. Known separators are fabricated of separator base materials which include among others, cellulosic fibers, polyolefin fibers, glass fibers, polyester fibers, phenol formaldhyde coated fibers and non-fiberous elastomeric polymers such as natural and synthetic elastomers.

Many known battery separators include protrusions carried by at least one surface of the separator. These protrusions may be carried in the form of embossed areas or as a plurality of solid ribs. Details relating to battery separators carrying such protrusions may be found in U.S. Patent Nos. 2,465,493; 3,351,495; 4,000,352; Canadian Patent No. 518,249; U.K. Pat. No. 783,729 and German Pat. No. 26 84 06.

The application of protrusions to a separator surface is designed to improve the mechanical strength and integrity of the separator and/or to provide and maintain a space of predetermined thickness between the plate and battery separator. In general, either embossed or rib-like protrusions can suitably perform this function. Embossed protrusions however can imply the possibility of non-uniform areas of thickness of the separator particularly in the embossed areas where some stretching of base material can occur. In practice, rib-like protrusions are preferred and these can be conveniently provided by extruding molten polymeric material onto the surface of the separator. The final separator usually comprises a plurality of parallel ribs which extend in continuous fashion across the surface of the separator. Details relating to a process for forming a plurality of polymeric ribs on a separator surface are described in U.S. Pat. No. 3,773,590.

Continuous processes for providing permanent, extruded ribs on battery separator surfaces present special considerations and complicated problems. Initially, it is important that effective adhesion between the rib and separator be achieved almost immediately after extrusion of the rib material onto the separator surface. Normally, achievement of this adhesion is promoted by heating the separator material and extruding the polymeric material at relatively high temperatures to provide enough tackiness for the extruded rib to stick to the heated separator surface. However, close control must be maintained over the temperature of the extruded material to assure that the extruded rib will provide the predetermined height dimension when solidified. If the extrusion temperature is too high, the viscosity of the extruded material may permit excessive flow of the material before solidification. Excessive flow can result in decreased rib height and more importantly can result in increased rib width or thickness.

An important consideration in preparing polymeric rib carrying separators involves the thickness or width of the rib base. As used here, rib base thickness or width means the thickness or width of the contact area of the rib base with the separator surface. Ideally, the rib base width or thickness should be maintained at a minimum because the surface area of the separator covered by the rib base is not available for electrolyte transfer. Accordingly, increase in rib thickness—particularly at the rib base—decreases the effective electrolyte transfer surface area which in turn, increases the ohmic resistance of the separator.

One attempt to control rib base thickness has involved the extrusion of ribs having a substantially circular cross-section in order to minimize the contact area between the rib base and separator surface. However, this attempt has not proven sufficiently reliable in providing uniformly effective adhesion of the circular cross-section ribs to the separator surface. The above-mentioned U.S. Pat. No. 3,773,590 teaches the extrusion of ribs which have a substantially circular cross-section. However the rib carrying separator is passed between rollers while the ribs are still deformable and the ribs are compressed into the separator surface. This compression provides ribs of a rectangular or semi-rectangular cross-section and the rib base thickness of the extruded rib is increased.

Another practice in the art involves extruding ribs of rectangular or trapezoidal cross-sections. A balance is achieved between the desired degree of tackiness for bonding and the temperature and viscosity of the extruded material by regulating the height of the molten rib material continually deposited on the moving surface of the separator. The height of the deposited molten rib material is usually somewhat greater than the height desired for the final solidified rib. After the molten material is deposited and bonded, the material is allowed to cool. Some decrease in height can occur on cooling because of shrinkage or settling and the rib base thickness usually increases until the bonded, molten material solidifies. Obviously, rib base thickness considerations become more complicated under this practice as the height of the rib is increased and ideally, the height of the rib should exceed the rib base thickness.

From the above description, it should be apparent that rib base height and thickness are primarily subject to the temperature and viscosity of the extruded material. However additional factors are involved such as rate of extrusion and rate of separator sheet material travel. All of these are important and each must be carefully controlled and synchronized to achieve uniform rib height and minimized rib thickness. Accordingly, there is an outstanding need in the art for a process for effectively bonding a plurality of ribs having uniform height and minimized rib base thickness to a separator sheet material. This invention is addressed to that outstanding need and provides a novel, relatively simple and inexpensive but particularly effective solution for the problem.

There is also another important art recognized need involved in preparing polymeric rib carrying battery separators. As those in the art know, various polymeric rib providing materials—particularly polyolefins—undergo severe shrinkage with cooling during solidification. In turn, this shrinkage can cause severe bowing or curling which adversely affects the flatness of the separator. The practice of the present invention provides polymeric rib carrying battery separators which are substantially flat even though the polymeric rib providing material may be one which undergoes severe shrinkage. Accordingly, the present invention provides the capability for effectively controlling flatness of the rib carrying separator combined with the capability for effectively providing ribs of uniform height and controlled rib base thickness or width.

BRIEF SUMMARY OF THE INVENTION

This invention presents to the art a novel, improved process for producing battery separators carrying a plurality of polymeric ribs on at least one separator surface and novel, improved battery separators produced by the process. The process essentially includes the steps of continually extruding a plurality of ribs in the form of molten polymeric rib providing material onto the surface of a battery separator to bond the material to the separator surface and cooling the extruded rib material to a substantially solidified state. After cooling of the bonded rib material, portions along the length of the ribs are compressed to provide ribs having alternating elevated segments of uniform maximum heights and depressed or compressed segments along the length of the rib. The final separator is one having a plurality of polymeric ribs securely bonded to the separator surface with the ribs being of uniform maximum height and uniform base thickness along the length of the ribs and with the rib carrying separator being substantially flat.

THE PREFERRED EMBODIMENTS OF THE INVENTION

Figure 1:
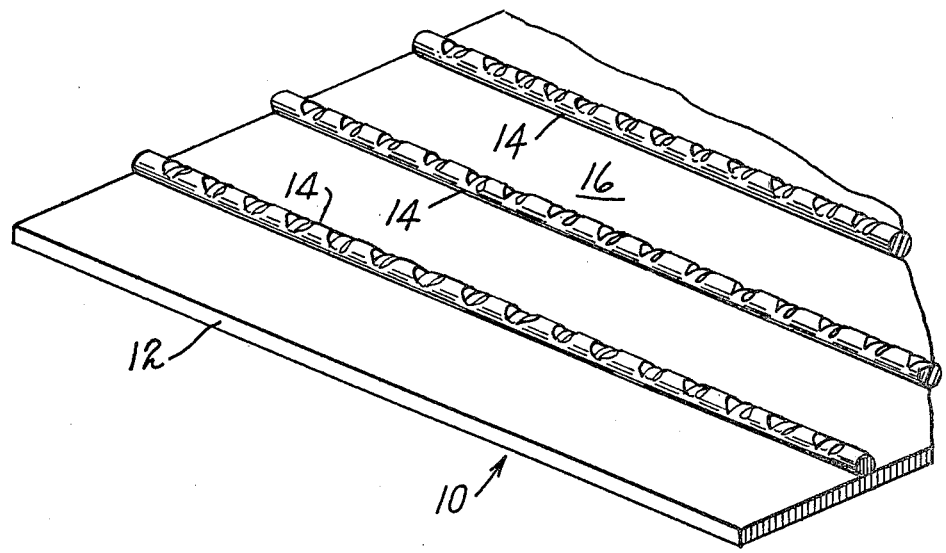
FIG. 1 is a schematic view of a portion of a battery separator carrying a plurality of polymeric ribs on the separator surface.
Figure 2:
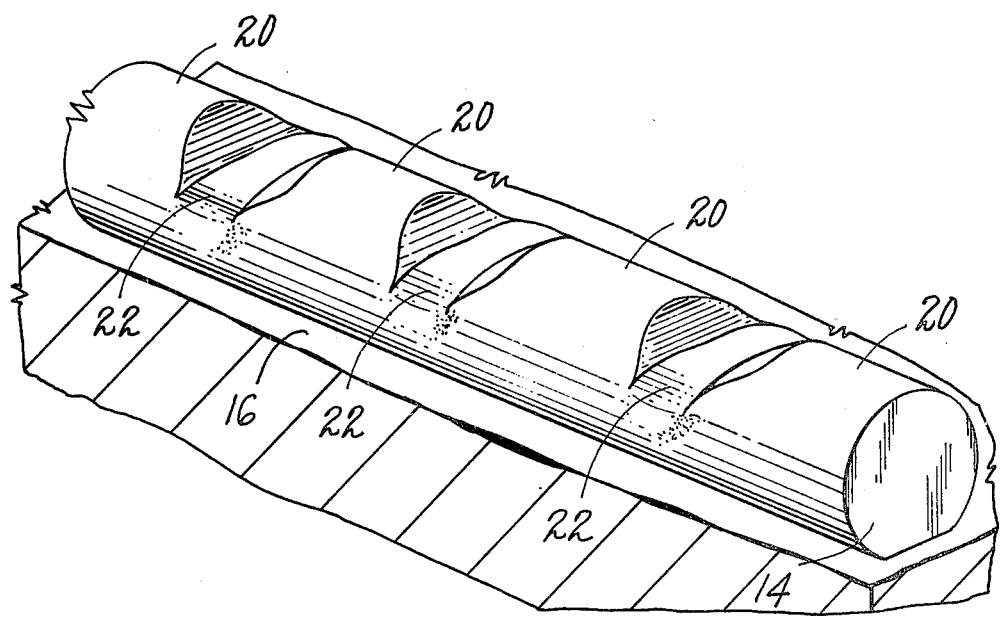
FIG. 2 is a schematic view of a polymeric rib carried on the surface of the separator of FIG. 1.

Illustrative rib carrying separators of this invention are shown in FIGS. 1 and 2. As shown there, the separator 10 (FIG. 1) comprises a separator base 12 and a plurality of solidified polymeric ribs 14 carried on surface 16 of base 12. Separator base 12 may be of any suitable battery separator base materials known to the art such as those mentioned before. Separator base materials in the preferred practice of the invention are the conventional phenolic or non-phenolic separator base materials and particularly a separator base material of the type described in commonly assigned U.S. patent application Ser. No. 345,173 filed by W. J. Bodendorf on Feb. 7, 1982.

Polymeric ribs 14 may be of any polymeric material which can be extruded at elevated temperatures to provide a rib capable of being adhered or bonded to surface 16 of a selected separator base 12. Particularly preferred polymeric materials are polyolefins or copolymers or mixtures of polyolefins; polymers of polyethylene and polypropylene for example are relatively inexpensive, easily extrudable and are preferred rib providing materials. Oftentimes pigments, fillers and/or foaming or blowing agents may be included in the polymeric rib providing material.

The ribs carried by battery separators of the present invention are best illustrated in FIG. 2. As shown there in magnified form, ribs 14 are not of a continuous, uniform height as in the case of the ribs described in U.S. Pat. No. 3,773,590. Instead, continuous ribs 14 have an undulating form provided by successively repeating elevated areas 20 and depressed or nipped areas 22. Elevated areas 20 provide individual rib segments having substantially uniform maximum heights with each segment bonded to surface 16. Depressed areas 22 provide individual rib segments which are strongly bonded to surface 16. Additionally as will be explained in detail later, the rib segments provided by areas 22 have the capability of relieving or nullifying the forces generated during any shrinkage of the polymeric material which can cause curling of the separator. The undulating form of ribs 14 provides special advantages over prior art battery separator ribs. Each individual rib is strongly bonded to the separator surface and provides the desired uniform rib height which as will be explained in detail later is obtained in a fully controllable manner. Additionally, the base thickness of each rib is substantially uniform along its entire length and, the rib carrying separator is substantially flat.

Another advantage of the undulating polymeric ribs of battery separators of this invention is shown in FIG. 2. As shown, the required spacing between plates is provided by elevated areas 20. However, the undulating form provides successively repeating depressed areas 22 which provide spaces through which electrolyte and gases can circulate. The design of prior art separator ribs of the type described in U.S. Pat. No. 3,773,590 essentially provide a series of isolated compartments between each set of adjacent ribs and circulation of electrolyte between compartments is restrained. However, the undulating form of ribs 14 provides a capability for improved circulation of electrolyte between the separator areas defined by each set of adjacent undulating ribs carried by the separator. This capability of providing improved circulation is a desirable feature for improved overall battery performance.

A representative, illustrative rib carrying battery separator of this invention can include a separator base material as described in the aforesaid U.S. Patent Application and having a thickness of 0.114 cm. and a length of 14.1 cm and width of 15.6 cm. Firmly bonded to the surface of the separator base material are 10 undulating ribs as described. The ribs comprise a polyolefin, (polyethylene and/or polypropylene) and are arranged parallel to each other with each rib extending across the surface of the separator. Each individual elevated segment 20 of each rib is circular in cross-section and has a maximum height of 0.046 cm and a length of 0.23 cm while each individual depressed area or segment 22 of each rib is about 0.05 cm in length. Each elevated segment 20 has a substantially uniform maximum thickness of 0.046 cm. Maximum rib base thickness for segments 20 is 0.037 cm and for segments 22 is also 0.037 cm.

Figure 3:
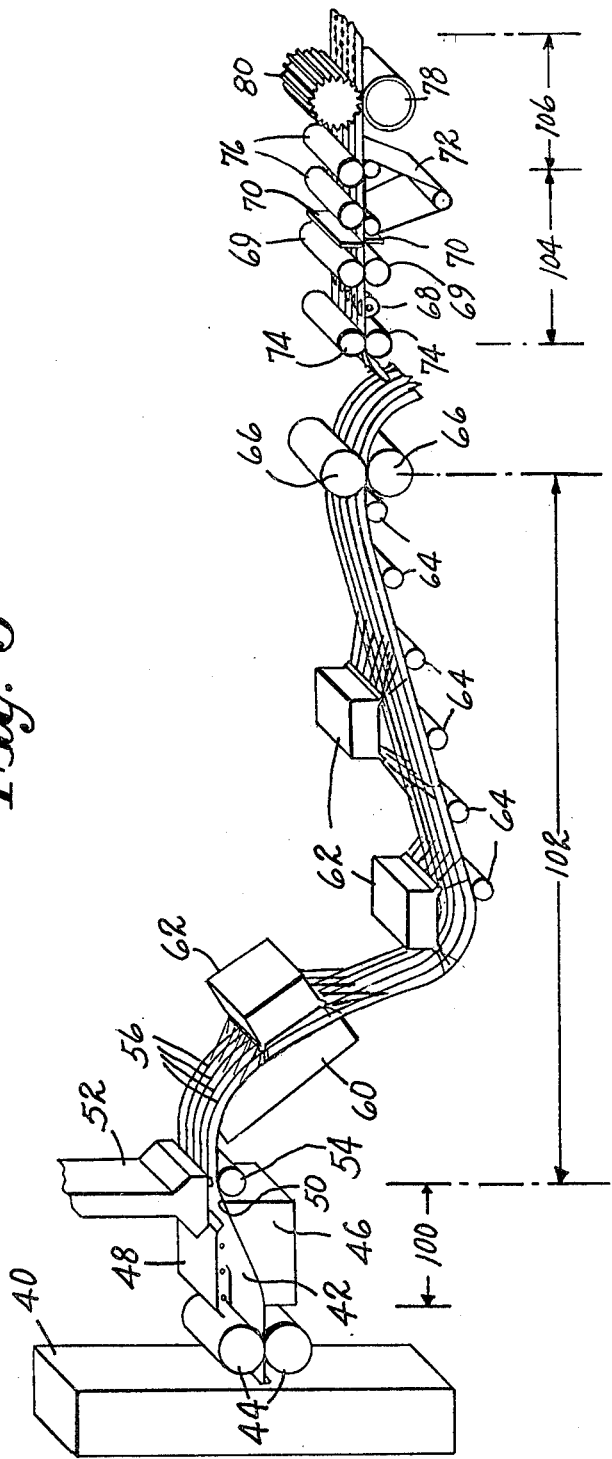
FIG. 3 is a schematic view of an arrangement of apparatus suitable for the continuous production of polymeric rib carrying battery separators of the invention.

FIG. 3 illustrates an arrangement of apparatus suitable for producing rib carrying battery separators of this invention. The arrangement of apparatus shown in FIG. 3 is designed to apply a plurality of polymeric ribs to the surface of a moving battery separator sheet material as a final step in the continuous on-line production of separator materials. The arrangement of apparatus shown provides four distinct stations—a rib extrusion station 100; a rib cooling station 102; a cutting and slitting station 104 and a rib portion compressing or rib crimping station 106. For illustrative purposes, the apparatus is shown arranged at the exit of final drying oven 40 for continually moving battery separator sheet material 42. As mentioned, sheet material 42 may be of any of the conventional battery separator base materials and in on-line production operations, the sheet material is usually between about 38 cm to about 100 cm wide and between about 0.030 to about 0.080 cm thick. Also, in conventional production operations, the speed of travel of sheet material 42 along the line can vary but usually speeds between about 0.8 to about 34 cm per second are involved.

Upon emerging from oven 40, sheet material 42 is shown passing between web pulling rolls 44 which are conventional and known to the art. Sheet material 42 is then directed to the rib extrusion station 100 which includes a heating table 46 which preferably has an upwardly extending surface as shown. Heating means 48 are arranged between rolls 44 and edge 50 (FIGS. 3 and 4) of table 46 so that the surface of sheet material 42 can be heated to temperatures between about 130° C. to about 200° C. Infra-red heating means such as quartz heaters—arranged and adapted to heat the surface of sheet material 42 to temperatures between about 130° C. to about 200° C. are particularly suitable.

Figure 4:
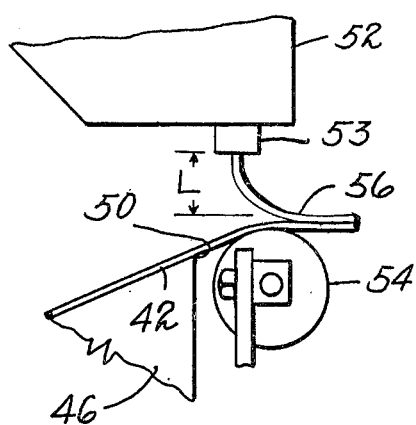
FIG. 4 is a schematic view of apparatus arranged to extrude polymeric rib providing material onto the surface of a battery separator.

An extruder 52 having a multi-hole die 53 (FIG. 4) is arranged near edge 50 so that a plurality of polymeric ribs 56 can be extruded onto the heated surface of sheet material 42. The die is preferably adapted to extrude rib material in a substantially circular cross-section shape to minimize contact area between the extruded rib providing material and the separator surface. A preferred arrangement of the extruder is shown in FIG. 4. As shown, an adjustable web bending roll 54 is arranged at the end of the upwardly extending surface of table 46. Roll 54 is adapted to carry moving sheet material 42 slightly upwardly from the edge 50 of table 46 and into close proximity to die 53. With this arrangement, the extruded molten material providing ribs 56 is continually deposited on sheet material 42 as material 42 is carried over the highest level of roll 54. In the arrangement shown, L represents the length of each extruded rib between the lip of the die and the surface of sheet material 42 and can vary depending upon the adjustment of wheel 54.

The throughput of extruder 52 is adapted to accommodate the speed and volume of polymeric material being extruded, the line speed of the separator material and the size of the ribs applied to the base. A preferred extruder is one which is capable of extruding polyethylene or polypropylene heated to a temperature of about 316° C. at a rate of 7.5 gms per sec. A suitable multi-hole die arrangement involves one providing 60 circular holes each having a diameter of about 0.118 cm. The path of sheet material 42 beneath multi-hole die 53 of extruder 52 is adjusted so that the length (L, FIG. 4) of each extruded rib between the lip of die 53 and the surface of sheet material 42 is controlled within the desired limits to provide effective extrusion onto the sheet material surface and immediate bonding of the extruded material to the surface. The controlled length of the ribs (L) will vary depending primarily on the polymer composition providing the ribs. However, continuous polyethylene ribs of uniform size can be extruded onto and bonded to the surface of separator material 42 when the length is between about 1 cm to about 5 cm at line speeds between about 5 cm per second to about 34 cm per sec.

Sheet material 42 carrying the extruded and bonded ribs 56 is moved along a path to rib cooling station 102. Preferably, the path after edge 50 of cooling table 60 is defined by an arc or curvature. The degree of curvature will vary depending on such factors as the polymeric rib material and the extrusion temperature involved. The curvature can partially compensate for shrinkage of the polymeric rib material and promotes improved adhesion of the extruded rib material to the separator surface.

Rib cooling station 102 includes at least one cooling table 60 where one or more air blowing means 62 are arranged and adapted to cool the bonded ribs 56. The length of cooling station 102 as well as the number and arrangement of air blowing means 62 and the number of guide rollers 64 and/or pull rollers 66 associated with cooling station 102 can vary. The primary consideration controlling the variations relate to the particular polymeric rib providing material involved and the extrusion temperature. Essentially, bonded ribs 56 must be cooled in the rib cooling station to a substantially solidified state. On-line operations have included a cooling station about 520 cm in length for line speeds of about 23 cm per second and having two air blowers arranged along the cooling station to blow air on the extruded rib material. These representative operating conditions have suitably cooled a plurality of polyethylene ribs extruded on the surface of the separator material at extrusion temperatures of 316° C.

In the preferred practice of the invention, separator sheet material 42 carrying cooled bonded ribs 56 is cut and slit at a cutting and slitting station 104 before the rib carrying sheet material is transported to rib portion compressing section 106. The cutting and slitting permits the use of a single rib carrying sheet material for producing separators having the different length, width and rib height dimensions specified by customers. The slitting and cutting apparatus involved is conventional apparatus routinely used in the paper making or battery separator manufacturing art. In the apparatus shown, rotatable circular blades 68 are used to slit sheet material 42 in the lengthwise dimension while a guillotine cutter 70 is used to cut sheet material 42 along its widthwise dimension. Cutting and slitting section 104 can also include one or more pull and/or guide rolls shown as 69. In preferred on-line operations, the rib carrying separator sheet material about 100 cm wide is slit and cut into individual sheets about 15 cm long by 15 cm wide.

In the preferred practice of the invention, the slit and cut separators are advanced to rib portion compressing or rib crimping station 106 by a belt-driven unit 72 which has a variable speed. Preferably the belt driven unit is operated at a line speed greater than the line speed for stations 100 and 102 so that the cut separators are quickly drawn away from cutter 70. Normally sheet material 42 is allowed to dip downwardly between rolls 66 and rolls 74 in order to compensate for the different line speeds. The speed of unit 72 is also adjusted to maintain the individual slit and cut separators at a predetermined, fixed lengthwise distance from one another. The slit and cut separators pass through a set of driving rolls 76 which feed the individual slit and cut separator materials to rib crimping station 106.

Rib crimping station 106 includes a pair of driven rolls 78 and 80 which provide or the rib crimping or compressing unit. Roll 78 has a smooth coaxial cylindrical surface parallel to the axis of rotation of roll 78 while roll 80 is a scored or gear roll carrying a plurality of teeth which are cut into the coaxial cylindrical surface preferably parallel to the axis of rotation of roll 80. Roll 80 can be a solid roll carrying a plurality of teeth as described or can consist of a solid roll fitted with a sleeve carrying the teeth. The gap between roll 78 and roll 80 is adjustable to control the degree of crimping to provide crimped ribs according to customers' specifications. Preferably means (not shown) are provided to separately control the speed of each roll 78 and 80; and preferably means (not shown) are also provided to maintain rolls 78 and 80 parallel to each other. These features reduce the possibility of overlapping of the individual separator materials and also assure a uniform degree of crimping for material processed through crimping station 106.

Figure 5:
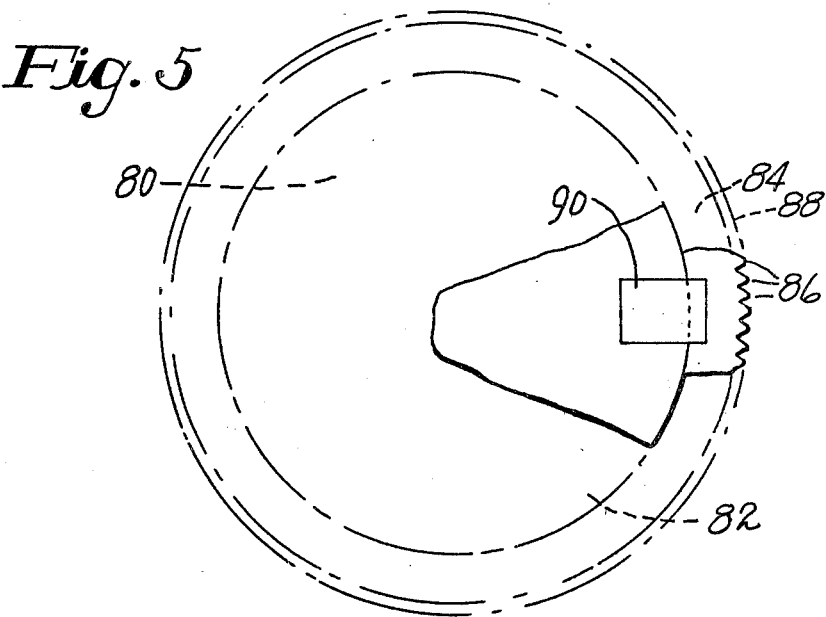
FIG. 5 is a partially sectional side view of an illustrative roll suitable for providing polymeric rib carrying battery separators of the invention.
Figure 6:
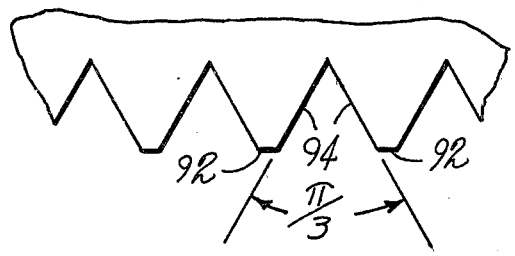
FIG. 6 is a partial sectional view of an arrangement of teeth carried by the surface of the roll of FIG. 5.

A suitable illustrative rib crimping unit for continuous on-line production of rib carrying separator materials of this invention is one in which roll 78 is about 102 cm long and has an O.D. of about 10 cm while crimping roll 80 is about 102 cm long and has an O.D. of about 10 cm. The rolls are spaced apart from each other by a uniform gap thickness of 0.08 cm and roll 78 is rotated at an angular velocity of 41.4 sec$^{-1}$ while roll 80 is rotated at an angular velocity of 41.4 sec.$^{-1}$ FIGS. 5 and 6 illustrate a preferred crimping roll 80. As shown, roll 80 comprises a solid shaft 82 carrying a cylindrical coaxial sleeve 84 having a plurality of teeth 86 cut into surface 88. Sleeve 84 is securely attached to shaft 82 such as by key 90. The O.D. of shaft 82 is about 7.6 cm while the O.D. of sleeve 84 is about 10.12 cm. A preferred tooth profile involves 160 teeth with each tooth having a maximum height of 0.14 cm with an angle of $\pi$ formed between tooth faces 94 as shown (FIG. 6).

After compressing portions of the ribs, multiple belt drives (not shown) are used to stack the rib carrying separator material. Apparatus involved in this stacking is conventional and well known to the art.

From the above description, it should be apparent that the invention presents an effective solution to the problem of providing battery separator ribs of uniform height with maximized control over rib base width or thickness. The ribs carried by battery separators of this invention have alternating elevated and depressed segments. Only the depressed segment is subject to the maximum compression by the teeth of the crimping roll. However the rib base thickness of the depressed segment is not significantly increased by the compression. Measurements of ribs produced according to this invention reveal that the average base width of the depressed segments is substantially the same as the average base width of the elevated segments. The invention is especially advantageous in providing separators carrying polymeric ribs having a height greater than the rib base thickness or width.

Figure 8:
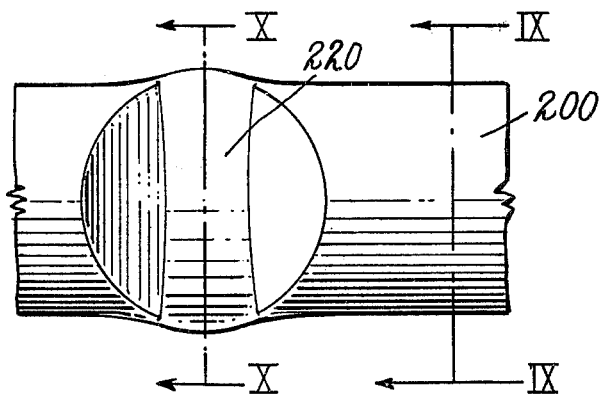
FIG. 8 is a top sectional view of the polymeric rib of FIG. 7.
Figure 7:
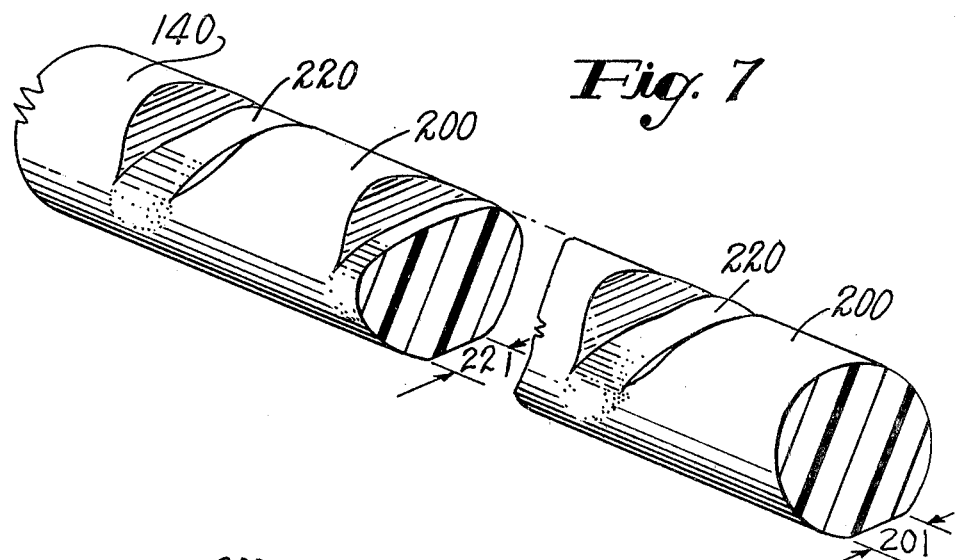
FIG. 7 is a schematic view of a polymeric rib carried on the surface of a battery separator of the invention.
Figure 9:
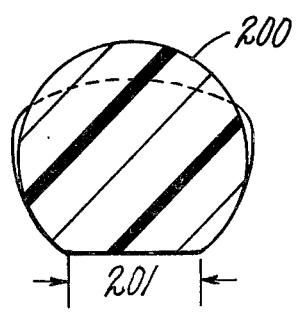
FIG. 9 is a cross-sectional view of the polymeric rib of FIG. 8 taken along lines IX—IX of FIG. 8.
Figure 10:
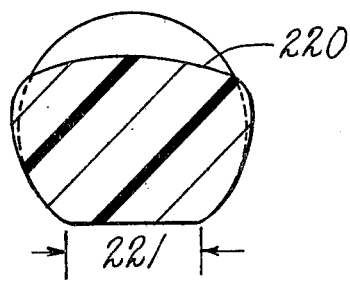
FIG. 10 is a cross-sectional view of the polymeric rib of FIG. 8 taken along lines X—X of FIG. 8.

The substantially uniform rib base thickness of the ribs carried by the separators of this invention is a significant achievement in view of the fact that portions of the rib are compressed into the separator surface. The achievement can be best appreciated by reference to FIGS. 7, 8, 9 and 10. Rib 140 of FIG. 7 comprises alternating elevated segments 200 and depressed segments 220 with elevated segments 200 representing the major portion of the lengthwise dimension of rib 140. As shown in FIGS. 7 and 9, a major portion about the circumference of segments 200 is circular in cross-section and accordingly, segments 200 are substantially circular in cross-sectional shape. The extrusion of ribs of circular cross-sectional shape is definately preferred in the practice of the invention since this cross-sectional shape provided minimal contact area (rib base thickness 201) between the extruded rib material and separator surface. As shown in FIG. 7, the rib width thickness of segments 200 is substantially uniform but as shown in FIG. 8, the rib width thickness of depressed segments 220 is greater than the thickness of segment 200. However as clearly shown in FIGS. 7 and 10, the rib base thickness 221 of depressed segments 220 has not been increased and is substantially the same as rib base thickness 201 (FIG. 9). The substantially uniform rib base thickness is achieved in part by cooling the bonded rib to a non-molten, substantially solidified state before crimping. In this state, compression primarily decreases the height of the compressed area and spreads the uppermost portion of the compressed material without affecting the original rib base thickness of the depressed areas.

An additional factor contributing to the achievement of substantially uniform rib base thickness is that the tooth profile of the crimping roll is preferably selected so that the portion of the length of the rib subjected to maximum compression represents only a minor portion of total rib length. For example, the area of maximum compression for the rib available with the tooth profile of FIG. 6 corresponds to the distance of surface 92. That area is relatively small compared to the area between faces 94 which is available for providing elevated segment 200. Preferably the ratio of the lengthwise dimension of the elevated segment to the lengthwise dimension of the depressed segments is 2:1 or greater.

In addition to the achievement of effectively providing ribs of uniform height with maximized control over rib base thickness or width, the invention also provides special advantages in controlling the flatness of the produced rib carrying product. Flatness is an important feature in battery separators. Batteries are usually assembled by automatic, high speed machines designed to remove an individual separator from a stack of separators for positioning between the battery plates. Effective removal and positioning requires that each separator in the stack be substantially flat.

As those in the art know, various polymeric rib providing materials—particularly polyolefins—undergo severe shrinkage on cooling. In turn, this shrinkage can generate forces capable of causing severe bowing or curling of the rib carrying separator. Known measures for controlling shrinkage to avoid bowing include the use of curvature paths at the extrusion station or the addition of foaming or blowing agents to the polymeric rib providing material. These measures provide a degree of control over shrinkage but must be carefully and continually monitored to assure maximized control.

The continuous process of this invention described above is capable of continuously producing polyethylene rib carrying separators of uniformly acceptable flatness. This achievement is believed to be directly related to the segmented character of the ribs. In some fashion, the crimping action in dividing the rib into elevated and depressed segments apparently nullifies at least a degree of the forces generated by shrinkage which occur on cooling and provides substantially flat separators. For example, severely bowed separators have been deliberately produced and cut into 15 cm×15 cm squares. These bowed separators were passed through the crimping rolls and the bowing was significantly reduced. Moreover, the degree of reduction of bowing can be controlled by changing the gap between the rolls and severely bowed separators can be restored to an acceptable degree of flatness in this manner. Additionally, on-line operations under conditions described with respect to FIG. 3 have continually provided polyolefin rib carrying battery separators (polyethylene and polypropylene ribs) of uniformly acceptable flatness. Accordingly, the rib crimping feature involved in the present invention inherently provides an effective means for controlling flatness of the separator as well as providing ribs of uniform height and controlled rib base thickness or width.

We claim:

1. A substantially flat battery separator carrying a plurality of polymeric ribs on at least one surface, said ribs comprising successive elevated and depressed segments and where said elevated segments are of substantially uniform maximum height and are substantially circular in cross-section and where the rib base width is substantially uniform along the entire length of the rib.

2. A battery separator 1 where the rib(s) extends across substantially the entire dimension of the rib carrying surface.

3. A battery separator of claim 1 or 2 where the rib(s) comprises polyolefin.

4. A battery separator of claim 1 or 2 where the maximum height of the elevated segments of each rib is equal to or greater than the rib base width.

5. A battery separator of claim 1 or 2 where the ratio of the lengthwise dimension of the elevated segments to the lengthwise dimension of the depressed segments along the length of the rib is 2:1 or more.

6. A battery separator of claim 1 or claim 2 where the rib comprises polyethylene or polypropylene or copolymers or mixtures of polyethylene and polypropylene.

* * * * *